United States Patent
Zafar et al.

(10) Patent No.: US 11,898,502 B2
(45) Date of Patent: Feb. 13, 2024

(54) SYSTEM AND METHODS FOR IMPROVING COMBUSTION TURBINE TURNDOWN CAPABILITY

(71) Applicant: General Electric Company, Schenectady, NY (US)

(72) Inventors: Adnan Fareed Zafar, Cypress, TX (US); Sameer Dinkar Vartak, Bengaluru (IN); Arun Kumar Sridharan, Bengaluru (IN); Jose Apolonio Burciaga-Santos, Durango (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 226 days.

(21) Appl. No.: 17/129,078

(22) Filed: Dec. 21, 2020

(65) Prior Publication Data

US 2022/0195948 A1 Jun. 23, 2022

(51) Int. Cl.
*F02C 9/28* (2006.01)
*F02C 3/30* (2006.01)
*F01N 3/10* (2006.01)
*F02C 9/18* (2006.01)

(52) U.S. Cl.
CPC .......... *F02C 9/28* (2013.01); *F02C 3/30* (2013.01); *F01N 3/106* (2013.01); *F02C 9/18* (2013.01);
(Continued)

(58) Field of Classification Search
CPC ...... F02C 3/30; F02C 9/18; F02C 9/26; F02C 9/28; F02C 9/50; F02C 9/52;
(Continued)

(56) References Cited

U.S. PATENT DOCUMENTS

2009/0053036 A1* 2/2009 Crawley .............. F02C 9/52 415/58.4
2009/0056342 A1 3/2009 Kirzhner
(Continued)

FOREIGN PATENT DOCUMENTS

EP 2826979 A1 1/2015
WO 2013/126279 A1 8/2013

OTHER PUBLICATIONS

European Extended Search Report from EP Application No. 21214159.2 dated May 3, 2022, 9 pgs.

*Primary Examiner* — Alain Chau
(74) *Attorney, Agent, or Firm* — Fletcher Yoder, P.C.

(57) ABSTRACT

Combustion turbine control systems are configured to operate combustion turbine systems in partial or no load while meeting emission targets. The combustion turbine system includes a combustion turbine, an electrical generator, a combustion turbine controller, a catalyst assembly, and/or other relevant equipment. Based on given operating constraints, such as load conditions and emission regulations, the combustion turbine controller may execute corresponding actions to control certain gas concentrations and/or gas mass flows in the exhaust gases in compliance with emission regulations. The corresponding actions may include, but are not limited to: controlling fuel and/or diluent injection(s) to combustor(s) to control combustion (e.g., combustion temperature) to manage combustion gas contents exiting from the combustor, controlling compressor bleed valve(s) to control the combustion temperature, controlling the catalyst assembly to process exhaust gases to be released into the environment, or a combination thereof.

19 Claims, 7 Drawing Sheets

(52) U.S. Cl.
CPC ............... *F05D 2270/082* (2013.01); *F05D 2270/0831* (2013.01); *F05D 2270/303* (2013.01)

(58) Field of Classification Search
CPC .. F05D 2270/08; F05D 2270/082; F01N 3/08; F01N 3/103; F01N 3/105; F01N 3/106; F01N 3/108
See application file for complete search history.

(56) References Cited

U.S. PATENT DOCUMENTS

| | | |
|---|---|---|
| 2010/0215480 A1 | 8/2010 | Each et al. |
| 2011/0138766 A1* | 6/2011 | ElKady ............... F02C 3/30 60/39.24 |
| 2014/0150438 A1* | 6/2014 | Ellis ............... F02C 9/263 60/734 |
| 2014/0216047 A1* | 8/2014 | Morisaki ............... F02C 7/36 60/774 |
| 2014/0283523 A1* | 9/2014 | Menon ............... F02C 9/40 60/39.281 |
| 2015/0020530 A1* | 1/2015 | Pandey ............... F02C 3/30 60/39.5 |
| 2015/0089955 A1* | 4/2015 | Knapp ............... F02C 9/18 60/785 |
| 2015/0204214 A1* | 7/2015 | McDeed ............... B01D 53/864 60/39.5 |
| 2016/0010566 A1* | 1/2016 | Bottcher ............... F02C 6/18 60/773 |
| 2017/0058784 A1* | 3/2017 | Vandale ............... F23R 3/346 |

\* cited by examiner

SYSTEM AND METHODS FOR IMPROVING COMBUSTION TURBINE TURNDOWN CAPABILITY

BACKGROUND

The present disclosure relates generally to operating combustion turbines with a wide range of power outputs. More particularly, this disclosure relates to operating combustion turbines in partial or no load while meeting emission targets.

Combustion turbines combust a mixture of compressed air and fuel to produce combustion gases. The combustion gases may flow through one or more turbine stages to generate rotational energy for use by a load (such as a generator). The combustion gases may include various combustion by-products, such as carbon monoxide (CO), nitrogen oxides (NOx), carbon dioxide (CO2), and so on. These by-products, or emissions, are generally subject to stringent regulations. In some cases, operating combustion turbines with an extended output power range may increase operational flexibility and efficiency of a power generation system. However, the cost of add-on emission controls to meet emission targets while maintaining the extended output power range of combustion turbines may become excessive.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of any kind.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a method is provided. In accordance with this method, an indication that a combustion turbine is to operate in a partial or no load condition is received. In response to receiving the indication, the combustion turbine is operated in the partial or no load condition, thereby generating exhaust emissions. Increasing a combustion temperature in the combustion turbine is employed in the partial to no load condition to increase a concentration of nitrous oxides (NOx) in the exhaust emissions and reduce a concentration of carbon monoxide (CO) in the exhaust emissions while maintaining an exhaust gas temperature and an exhaust emissions profile of a minimum load condition in which the combustion temperature is not increased.

In a second embodiment, a system is provided. The system includes a combustion turbine, multiple sensing devices, and a controller. The controller is configured to execute actions to control gas concentrations and gas mass flows in emission gases in compliance with emission targets. The actions include receiving an indication that the combustion turbine is to operate at a load lower than a full-load and determining operation parameters corresponding to the load lower than the full-load. The actions also include operating the combustion turbine at the load lower than the full-load using the operation parameters. Based at least on operating at the load lower than the full-load, a combustion temperature is increased in the combustion turbine to increase a concentration of a first emission gas type and to reduce a concentration of a second emission gas type. The actions also include dynamically increasing catalyzation in a catalyst assembly used to treat emission gases to meet emission targets to compensate for the increased combustion temperature during the operating at the load lower than the full-load.

In a third embodiment, a system is provided. The system includes a combustion turbine, multiple sensing devices, a catalyst assembly, and a controller. The catalyst is configured to treat emission gases from the combustion turbine to meet emission targets. The controller is configured to execute actions to control gas concentrations and gas mass flows in emission gases in compliance with emission targets. The actions include receiving an indication that the combustion turbine is to operate in a partial or no load condition and determining operation parameters corresponding to the partial or no load condition based at least in part on the indication. The actions also include operating in the partial or no load condition using the operation parameters. Based at least in part on operating in the partial or no load condition, adjusting the operation of the combustion turbine. The actions also include dynamically increasing catalyzation in the catalyst assembly to compensate for the increased combustion temperature during the operating in the partial or no load condition. The actions further include utilizing the multiple sensing devices to measure performance-related parameters of the combustion turbine. Based at least in part on the performance-related parameters, the operation of the combustion turbine is adjusted during the operating in the partial or no load condition.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
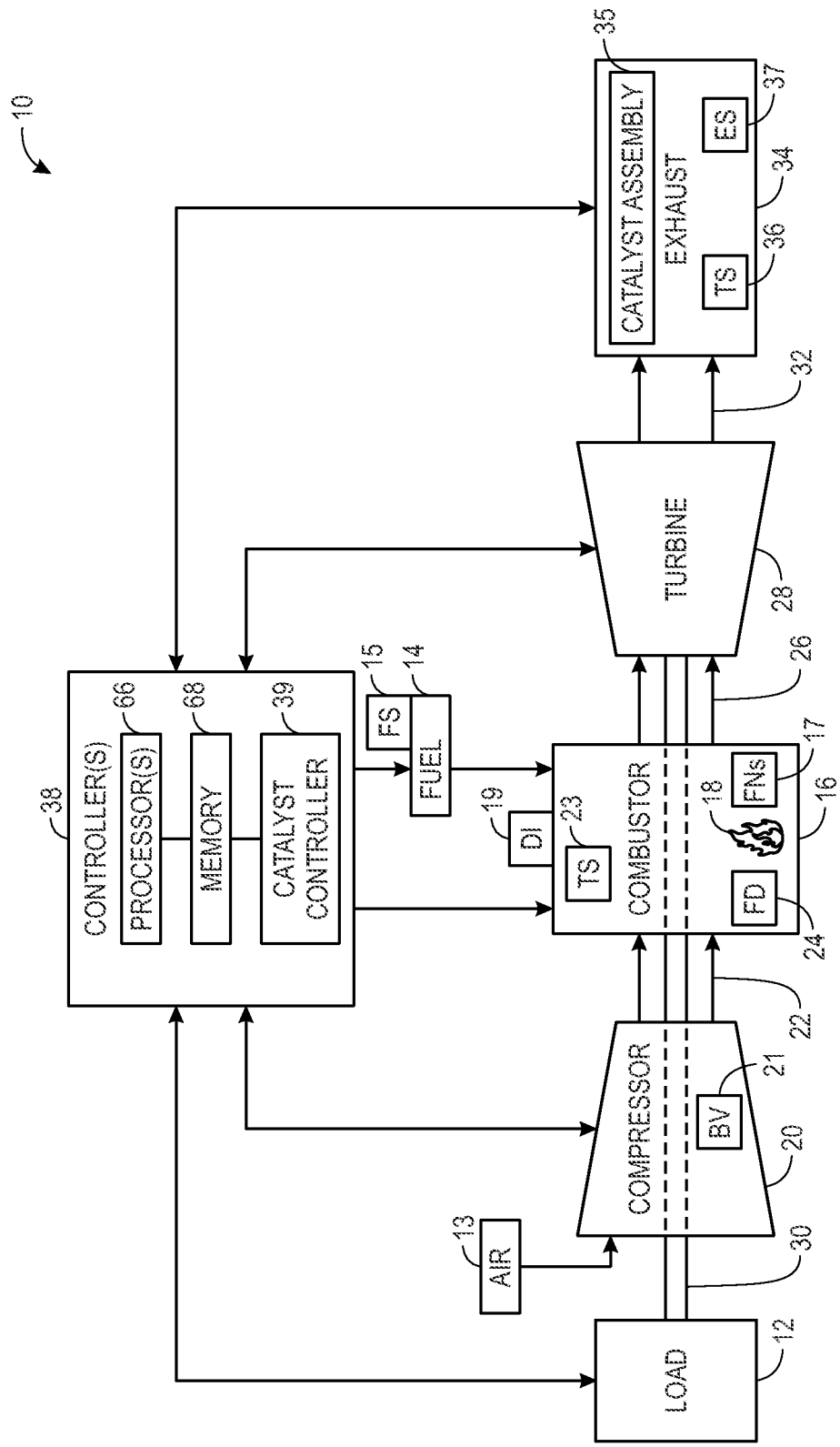
FIG. 1 is a block diagram of a combustion turbine engine configured to power a load, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Combustion turbine generators (CTGs) in power plants create emission gases from their combustion processes during operations. The emission gases may contain toxic gases and pollutants (such as nitrogen oxides ($NO_x$), carbon monoxide (CO), and unburned hydrocarbon), which are treated (e.g., by catalytic assemblies in exhaust systems of the CTGs) to meet emission regulations. In some instances, the catalytic assemblies are selective catalytic reduction (SCR) systems, which operate optimally at certain concentrations of emissions. Based on given operating constraints (such as load conditions and emission regulations), a combustion turbine controller may execute corresponding actions to control certain gas concentrations and/or gas mass flows in the emission gases in compliance with emission regulations.

The present disclosure relates generally to operating combustion turbines in wide range of power outputs (e.g., partial and/or no load) while meeting emission targets under environmental regulations. Using the disclosed technologies herein may improve operational performance of the CTGs. In an embodiment, NOx emissions compliance may be achieved at reduced hardware-cost, complexity, and enhanced reliability of a CTG due to a narrower inlet NOx flow range to the SCR than approaches with SCR modifications, which would otherwise be used to post-process inlet NOx conditions with a wider inlet NOx flow range to the SCR. In an embodiment, CO emissions compliance may be achieved due to a higher combustion-temperature at low load operations as compared to approaches with added CO catalyst expenses, which would otherwise be necessary to post-process high CO flows at low load operations that often have lower combustion temperatures.

Using the disclosed technologies herein may improve operability of the CTGs. In an embodiment, at low-load steady-state and/or during transient operations (e.g., transient to lower load operations), a better or equal compressor stall margin in the CTGs may be achieved as compared to CTG operations using reduced compressor pressure ratios for a given operating point via bleeds. The increased compressor stall margin may reduce the likelihood of CTG component distress and damage during steady-state or transient operation. Using the disclosed technologies herein may also improve component life and durability of the CTGs. In an embodiment, combustion engine hot-section life may be improved due to reduced water injection (e.g., in CTGs using water as a diluent).

Besides improvements in operability and durability of the CTGs and their components as described above, the disclosed technologies herein may broaden CTG applications in power generation systems. In some applications, certain electricity markets may financially compensate CTG power plants for a wider power operating range that extends to lower loads, which may be achievable by implementing the disclosed technologies (such as simple ammonia ($NH_3$) injection systems sized for high $NH_3$ flows and SCR systems with small and more efficient CO catalysts). Such implementations facilitate low load CTG operations for less cost than upsized and complex modifications (e.g., SCR system modifications). Therefore, added revenue of the enhanced operating range may generate a larger profit for the CTG power plant as compared to using the upsized and complex modifications. In an embodiment, a vendor (e.g. a power distributor) may sell electricity generated from the CTGs implemented with the disclosed technologies, which provide the same or similar operating range as the CTGs facilitated with expensive modifications, thereby increasing the price, profit margin, and/or incentives for selling electricity.

In certain cases, hybrid power plants containing energy storage systems (ESS) and/or thermal generation assets, which provide a wide power operating range (e.g., extending to low loads), may be designed with equivalent or lower cost and with greater flexibility than those without using the disclosed technologies. For example, to operate at loads lower than a threshold load of a thermal asset, the ESS may consume excessive power beyond a desired plant power operating point. Consuming this power may require increasing the power output and/or energy capacity of the ESS, thereby adding capital and operating costs. To avoid such additional cost, hybrid power plants may implement thermal modifications to facilitate low load thermal operation and a smaller ESS. As a comparison, with the disclosed technologies, the minimum load of the thermal asset may be higher than the thermal modifications, but the total cost with the larger ESS may be the same or lower. The use of the ESS may add flexibility and potential revenue sources that may scale with the ESS size. As ESS prices may reduce over time, the added cost of the ESS may reduce accordingly, thereby reducing the total cost. Such increased flexibility may be helpful to increase profit margins, reduce the price, or add large amounts of energy storage to increase the value and potentially increase the profit margins.

With the preceding in mind, turning now to the drawings, FIG. 1 is a block diagram of an embodiment of a combustion turbine system 10. As an example, the combustion turbine system 10 may be part of a combined cycle system or combined with other combustion turbine systems 10 to power one or more loads 12. Specifically, the combustion turbine system 10 is generally configured to drive the load 12 by combusting a mixture of compressed air 22 and fuel 14 (e.g., natural gas, light or heavy distillate oil, naphtha, crude oil, residual oil, or syngas). The combustion is performed within a combustor 16, which may include one or more combustion chambers. A fuel sensor (FS) 15 may be used to monitor the fuel injection rate to the combustor 16. Air 13 goes into an air intake at the compressor 20, is filtered, and then is compressed in the compressor 20 via one or more compression stages. A compressed air stream 22 generated from the compressor 20 is directed into the combustor 16.

As illustrated, the compressor 20 may include one or more bleed valves (BVs) 21. The degree of valve opening or closing of the bleed valves 21 may be adjustable. For example, when the combustion turbine system 10 is operating during shutdown or at low power operation, the bleed valves 21 may be adjusted to certain degree(s) to reduce the air flow rate. The bleed valves 21 may be installed at different locations on the compressor 20 or between compressors in a multi-compressor system.

To begin the combustion process within the combustor 16, the compressed air stream 22 is mixed with fuel 14. Using the mixture of the fuel 14 and the compressed air stream 22, ignition may occur within the combustion chamber(s). The ignition produces hot combustion gases 26 that power the combustion turbine system 10. More specifically, the hot combustion gases 26 flow through a turbine 28 with one or more compression stages that drives the load 12 via a shaft 30. For example, the combustion gases 26 may apply motive forces (e.g., via convection, expansion, and the like) to turbine rotor blades within the turbine 28 to rotate the shaft 30. In an example process, the hot combustion gases 26 may force turbine blades in the turbine 28 to rotate the shaft 30 along an axis of the combustion turbine system 10. As illustrated, the shaft 30 may be connected to various components of the combustion turbine system 10, including the compressor 20 or the load 12.

In some embodiments, various controlling and monitoring devices may be used to control and monitor the combustions in the combustor 16. In the embodiment of FIG. 1, the combustor 16 includes one or more fuel nozzles (FNs) 17, which may be at different locations on the combustor 16. Fuel flow to the fuel nozzles 17 is adjustable so that the fuel injections to the combustor 16 are controllable. For instance, the controller 38 may utilize fuel flow circuits coupled to the fuel nozzles 17 to adjust a fuel-to-air ratio in the combustor 16. Adjusting the fuel nozzles 17 may enable controlling the fuel split between the fuel injection ports (e.g., fuel nozzles 17) on the combustor 16. The controllable fuel split may change certain physical properties of a combustion flame 18, such as the temperature and the location of the combustion flame 18. In some embodiments, the controller 38 may utilize the fuel flow circuits to adjust one or more fuel delivery valves to direct fuel flow into passages in one or more fuel nozzles 17 and in the combustor 16. In some embodiments, additional monitoring device(s) may be used to monitor certain physical properties of the combustion flame 18. For example, temperature sensor(s) (TSs) 23 may be used to measure the temperature of the combustion flame 18. In certain embodiments, flame detector(s) (FDs) 24 may be used to detect the presence and/or location of the combustion flame 18.

As illustrated in FIG. 1, a diluent injection (DI) system 19 is coupled to the combustor 16. The diluent injection system 19 may inject specific diluent (such as water or steam) into the combustor 16 to change certain physical properties (e.g., temperature) of the combustion flame 18, therefore maintaining specific emission(s) in the exhaust gases 32 in compliance with emission regulations. For example, the water or steam injection may be used by the diluent injection system 19 to cool the temperature of the combustion flame 18 to reduce the formation of $NO_x$.

As previously noted, the shaft 30 may connect the turbine 28 to the compressor 20 to form a rotor. The compressor 20 may include compressor blades coupled to the shaft 30. Thus, rotation of turbine blades in the turbine 28 may cause the shaft 30 connecting the turbine 28 to the compressor 20 to rotate the compressor blades within the compressor 20. This rotation of compressor blades in the compressor 20 causes the compressor 20 to compress air 13 to generate the compressed air stream 22. As previously noted, the compressed air stream 22 is then fed to the combustor 16 and mixed with other combustion components. The shaft 30 may drive the compressor 20 in addition to or in lieu of the load 12. As an example, the load 12 may be a generator of the combustion turbine system 10. Additionally or alternatively, the load 12 may include a propeller, a transmission, a drive system, or any other mechanism that is configured to receive mechanical force through rotation of the shaft 30.

Once the turbine 28 extracts work from the hot combustion gases 26, a stream of exhaust gas 32 may be provided to an exhaust section 34, where the exhaust gas 32 may be further processed and/or cooled. For example, in the illustrated embodiment, the exhaust section 34 may include a catalyst assembly 35. The catalyst assembly 35 is an exhaust emission control device that reduces toxic gases and pollutants in the exhaust gas 32 by using various after-treatment emission control technologies, such as oxidation catalysts and/or selective catalytic reduction (SCR).

The catalyst assembly 35 may use one or more oxidation catalysts to treat specific emission(s) in the exhaust gas 32. The oxidation catalysts may include CO catalyst, $NO_x$ catalyst, unburned hydrocarbon catalyst, and/or any similar metal-based (e.g., platinum-based) catalyst. For example, the catalyst assembly 35 may include $NO_x$ catalysts to destroy $NO_x$ gases within the stream of exhaust gas 32. The stream of exhaust gas 32 may then exit the exhaust section 34 after treatment provided by the catalyst assembly 35.

The catalyst assembly 35 may also include a selective catalytic reduction (SCR) system. The SCR system converts $NO_x$ with the aid of catalyst(s) (e.g., titanium oxide) into diatomic nitrogen ($N_2$) and water ($H_2O$). A gaseous reductant (such as anhydrous ammonia), aqueous ammonia, or urea, may be added to the exhaust gas 32 and be adsorbed onto the catalyst(s). For example, an ammonia ($NH_3$) injection system may be used to inject the ammonia into the exhaust gas 32. The exhaust gas 32 mixes with the ammonia and enters a reactor containing the catalyst(s), where the ammonia reacts selectively with the $NO_x$ within a specific temperature range and in the presence of the catalyst(s).

The exhaust section 34 may include various monitoring device(s) to monitor the physical properties (e.g., temperature of the exhaust gas 32) and/or chemical properties (e.g., emission gas concentrations). For example, the exhaust section 34 may include one or more temperature sensors (TSs) 36 to measure the temperature of the exhaust gas 32. In some embodiments, the exhaust section 34 may include one or more emission sensors (ESs) 37 to measure the concentrations and/or mass flows of specific emission gases (e.g., CO and $NO_x$).

As illustrated, combustion turbine system 10 includes one or more controllers 38. The controller 38 may include one or more processors 66 and memory 68, which may be used collectively to support an operating system, software applications and systems, and so forth, useful in implementing the techniques described herein. Particularly, the controller 38 may include code or instructions stored in a non-transitory machine-readable medium (e.g., memory 68) and executed, for example, by the one or more processors 66 that may be included in the controller 38. The processor(s) 66 may receive parameters of operation from the various components of the combustion turbine system 10 including rotation speed of the shaft 30, frequency and/or voltage of electric power generated by the combustion turbine system 10 via a generator (e.g., load 12) driven by the shaft 30, a demand from one or more load(s) 12, or other suitable parameters. In some embodiments, some parameters are measured directly while other parameters are determined indirectly from other measurements. For example, in certain embodiments, the controller 38 may utilize an algorithmic model or look-up table (e.g., stored in memory 68) to derive various parameters, such as the operating speed of the shaft 30 or a connected generator using electrical parameters such as frequency or voltage of the electric power generated by the generator.

Further, the controller 38 may monitor operation of various parts of the combustion turbine system 10 via specific monitoring devices. The monitored parameters may include, but are not limited to, the following: injection rate of the fuel 14 (e.g., via the fuel sensor 15), temperature and location of the combustion flame 18 in the combustor 16 (e.g., via a temperature sensor 23 and a flame sensor 24), temperature of the exhaust gas 32 in the exhaust section 34 (e.g., via the temperature sensors 36), concentrations and/or mass flows of specific emission gases (e.g., CO and $NO_x$) of the exhaust gas 32 in the exhaust section 34 (e.g., via emission sensors 37), or other relevant parameters. The monitored parameters may be used to control (e.g., adjust) operating parameters of one or more aspects of the combustion turbine system 10. For example, during the operation of the combustion turbine system 10, the temperature of the exhaust gas 32 inside the exhaust section 34 may be measured by the one or more temperature sensors 36. Based on the measured temperature of the exhaust gas 32, the controller 38 may cause the one or more bleed valves 21 to adjust the degree of valve opening, and/or may control the fuel split between the fuel nozzles 17, therefore changing (e.g., increasing) the temperature of the exhaust gas 32.

As illustrated, the controller 38 may include a catalyst controller 39. The catalyst controller 39 is configured to communicatively couple to the catalyst assembly 35. In one example, the catalyst controller 39 is configured to receive signals representative of a temperature of an exhaust flow upstream of the catalyst assembly 35 and the temperature of a treated exhaust flow downstream of the catalyst assembly 35. The one or more temperature sensors 36 may be disposed upstream of the catalyst assembly 35 and downstream of the catalyst assembly 35. The catalyst controller 39 may determine a target temperature, which is based at least in part on suitable emission level(s) (e.g., $NO_x$, and/or CO level). The catalyst controller 39 may generate (e.g., via the one or more processors 66) control signals that correspond to the target temperature. For example, the control signals may include instruction(s) to increase the temperature of the exhaust gas 32 before the exhaust gas 32 flows into the catalyst assembly 35. The control signals corresponding to the target temperature may be sent to the one or more bleed valves 21 on the compressor 20 to adjust the degree of valve opening, or to the one or more fuel supply lines (not separately shown) to the combustor to control the fuel split between the fuel nozzles 17, therefore regulating the temperature of the exhaust gas 32 to the target temperature. By controlling the temperature of the exhaust gas 32 flowing into the catalyst assembly 35, certain emission gases (such as $NO_x$ and CO) may be controlled to achieve suitable levels in compliance with emission regulations, regardless of the operating load of the combustion turbine system 10.

It should be noted that the components described above with regard to the combustion turbine system 10 are example components. For instance, some embodiments of the combustion turbine system 10 may include additional or fewer components than those shown. For example, various embodiments of the combustion turbine system 10 may include multiple shafts, multiple combustors, multiple catalyst assemblies, and/or other suitable turbine system components.

As stated previously, exhaust emission control devices (e.g., the catalyst assembly 35) may be used to reduce toxic gases and pollutants, such as NOx and CO gases, before expelling the exhaust gas into atmosphere through the exhaust section 34. In operation, a combustion turbine (e.g., the combustion turbine system 10) may produce large amounts of emissions, which are treated (e.g., by the catalysts and/or SCR) before expelling into atmosphere to meet emission regulations.

With the preceding in mind, material related to exhaust gases (e.g., NOx and CO gases) expelled from combustion engines in a power plant is provided below to impart some familiarity with such exhaust gases and provide useful real-world context for other aspects of the disclosure.

The term "NOx" refers to nitrogen oxides that are classified as air pollution, such as nitric oxide (NO) and nitrogen dioxide ($NO_2$). NOx gases may be produced from the reaction among nitrogen and oxygen during combustion of fuels (e.g., hydrocarbons) in combustion turbines (e.g. the combustion turbine system 10). In some cases, CTG power plants may have operating permits that set limits on NOx emissions as a limit on air pollution. Carbon monoxide (CO) is a colorless, odorless, and tasteless flammable gas that is also a regulated atmospheric pollutant.

The NOx and CO gases produced during combustion may lead to an emission increase without readjustment of operational settings of the CTG power plant operation and maintenance. For instance, in some embodiments, the NOx emission may increase in high combustion flame temperatures often used at high load operation. In other embodiments, the CO emission may restrict partial/no load operation, which may be used more frequently due to the increasing involvement of intermittent renewable power (such as wind power and solar power).

CTG power plants may be designed to operate in a specific power range to maintain emissions compliance (e.g., meeting certain emission targets). The emissions targets may include instantaneous and/or integrated exhaust gas concentrations or masses for specific constituent gases such as $NO_x$ and CO. The operating power range of a CTG power plant may be specified by a minimum operating power ($P_{min}$) and a maximum operating power ($P_{max}$). A power plant operating at a lower $P_{min}$ may provide larger dispatch flexibility and electrical grid efficiency. However, operating in an extended power range (e.g., with a $P_{min}$ that is less than 25% of a CTG power plant full load) may not align with the existing combustion turbine designs (such as exhaust emissions controls including diluent injection, precise fuel injection, and combustion control), which were originally made for a limited power range (e.g., with a $P_{min}$ that is higher than 50% of the CTG power plant full load).

To operate in an extended power range, a combustion turbine (CT) in a power plant may be modified to meet the emission targets across the CT's operating range. For example, the CT modifications may include implementing advanced combustion control technologies (e.g., fuel injection hardware for precise fuel control). Additionally, or alternatively, the CT modifications may be related to post-processing of the exhaust gases, such as increasing CO catalyst, modifying ammonia injection system for lower $NO_x$ flow range, advanced SCR control, or a combination thereof. However, such modifications may result in excessive cost, which may inhibit the CTG power plant operational flexibility. For example, a CTG power plant initially designed with a predetermined cost may limit the minimum operating power to a specific threshold (e.g., a power output that is 50% of CTG power plant full load). As such, the CTG power plant may be inhibited from a lower power operation mode (e.g., an operation with output power lower than 25% of CTG power plant full load) due to excessive cost (e.g., cost related to CO catalyst usage and/or SCR modification).

Figure 2:
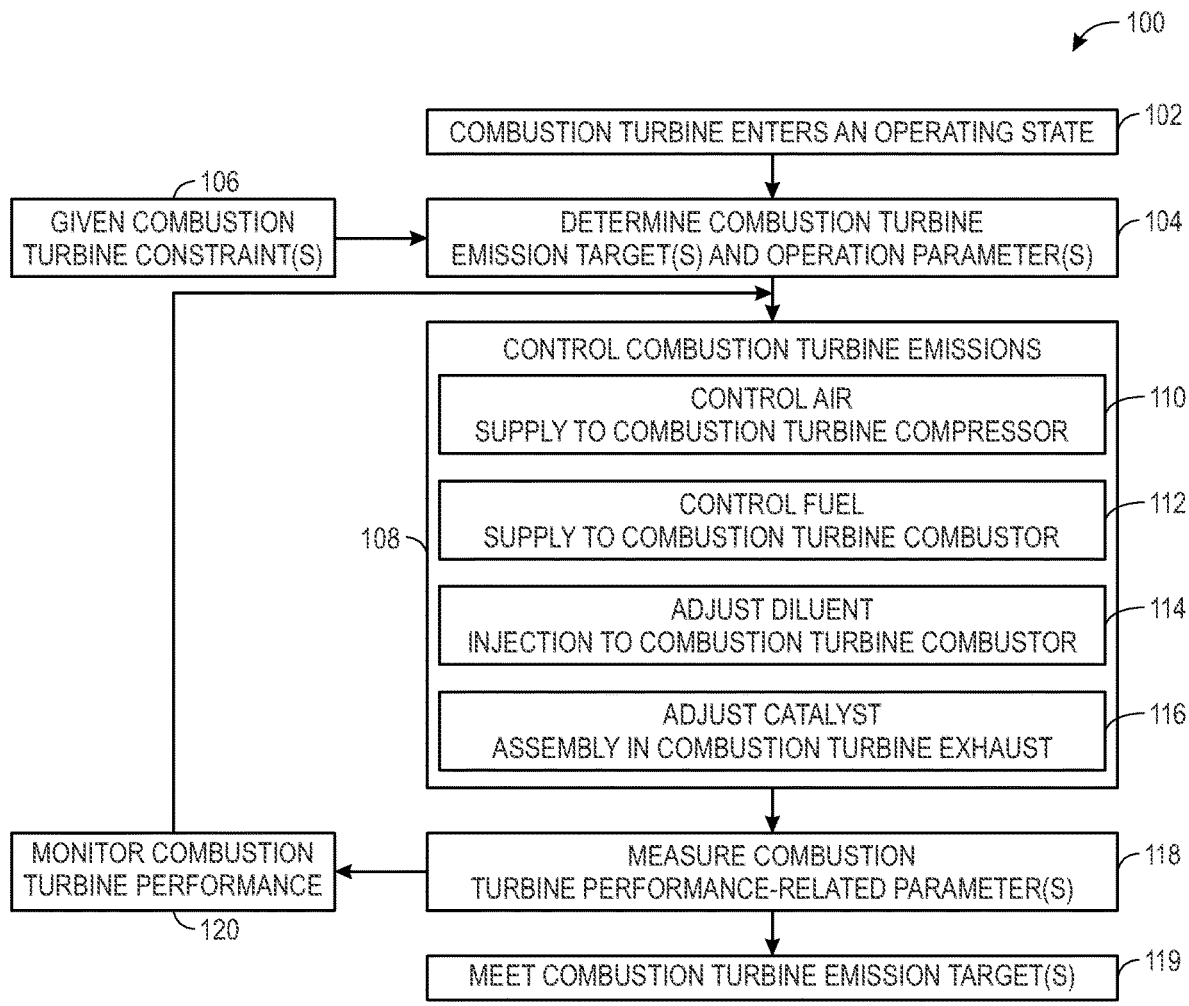
FIG. 2 shows a flow chart depicting an emission control process that may be used to operate the combustion turbine engine of FIG. 1, in accordance with an embodiment.

The technologies described in the present disclosure may provide a suitable approach for CTs to operate in a wider power range in emissions compliance while avoiding expensive CT modifications (e.g., upsizing the SCR system and/or modifying the fuel injection system). FIG. 2 shows a flow chart depicting an emission control process 100 that may be used to operate CTs (e.g., the combustion turbine system 10) in an extended power range without experiencing costly modifications.

The emission control process 100 may be initiated when a combustion turbine (CT) enters an operating state (block 102) that is different from a previous operating state. In some embodiments, the CT may receive an indication that the combustion turbine is to operate at a load lower than a full-load (e.g., partial or no load). The indication may include a processor-generated signal (e.g., from the controller 38), an analog signal, a sensor signal from a sensor, an artificial intelligence inference made using a neural network, a user input, and/or other suitable signals or inputs. For example, the CT may receive an instruction (e.g., from a CT operator via a certain user interface that may be communicatively coupled to the controller 38) to switch from a high load operation (e.g., higher than 50% of CT full load) to a low load operation (e.g., lower than 25% of CT full load), to switch from the low load operation to the high load operation, to shut down from an active state, and to startup from inactive state.

As discussed below, when switching from a high load operation to a low load operation, the controller 38 may determine emission targets (e.g., output target emission from exhaust section 34) for different by-products based on the new load and other operation-related information. According to the new emission targets, the CT may perform a variety of operations to control emissions through regulating certain gas concentrations and/or gas mass flows in the exhaust gases in compliance with the emission targets. As load reduces, total exhaust gas mass flow reduces accordingly. To maintain a consistent NOx rate between high and low loads, the controller 38 may increase a combustion temperature to raise NOx concentration in the reduced total exhaust gas mass flow when operating in a low load mode. With consistent NOx flow rates, the SCR may consistently handle the NOx in both high and low loads. Furthermore, by increasing the combustion temperature, the CO concentration is reduced below the CO concentration at lower temperatures. In some embodiments, the controller 38 may change a fuel type (e.g., switch to another fuel such as hydrogen gas) or change a mixture ratio of different fuel types to utilize an increased combustion temperature to maintain a consistent NOx rate between high and low loads.

After the CT enters a new operating state (e.g., a low load operation), the controller 38 may determine CT emission targets and operation parameters for the new state (block 104). The emission targets may include, but are not limited to, the following: instantaneous and/or integrated exhaust gas concentrations, the instantaneous and/or integrated exhaust gas masses or mass flows, and constraints for certain exhaust gases (e.g., NOx and CO gases) in a CT exhaust flow (e.g., a treated exhaust flow downstream of the catalyst assembly 35). As discussed previously, the CT may be designed to operate in a specific power range in emissions compliance (e.g., meeting certain emission targets listed above).

Determining CT emission targets and operation parameters may be conducted by the controller 38, via the one or more processors 66 and memory 68. For instance, based on the new operating state of the CT (e.g., 5% of CT full load), the controller 38 may access certain CT operation-related code or instructions stored in a non-transitory machine-readable medium (e.g., memory 68). The controller 38 may execute accessed code or instructions by the one or more processors 66 to determine the emission targets and operation parameters corresponding to the new operating state of the CT. The operating parameters may be related to CT operation and performance, which may be collected and/or derived empirically during CT manufacturing, on-site performance tests during operation, and/or the like.

In some embodiments, the controller 38 may receive, from a different source, additional/supplemental information (e.g., CT operating constraints) that may be used in determining the emission targets and operation parameters (block 106). For instance, the controller 38 may receive, via a user interface (e.g., a CT control interface controlled using a keyboard, mouse, or keypad), information related to given CT operating constraints. Examples of the given CT operating constraints may include specific gas concentration or mass flow limits of the exhaust gas 32 flowing into the catalyst assembly 35, and/or specific gas concentration or mass flow limits of treated exhaust gas exiting from the exhaust section 34, and other operating constraints.

Additionally, or alternatively, the controller 38 may use a look-up table stored in a non-transitory machine-readable medium (e.g., memory 68) to search the CT emission targets and operation parameters corresponding to the new operating state of the CT, with or without the additional/supplemental information that relates to given CT operating constraints. In some cases, the controller 38 may use a simulation model stored in a non-transitory machine-readable medium (e.g., memory 68) or a remote network (e.g., a cloud) to determine the CT emission targets and operation parameters based at least in part on the additional/supplemental information. For example, the simulation model may take inputs, such as certain operating parameters/settings related to the new operating state of CT and/or the operator-provided additional/supplemental information that relates to given CT operating constraints to run simulation(s) to determine CT emission targets and operation parameters. In certain cases, a CT operator may directly provide, via the user interface, the CT emission targets and operation parameters based on the new operating state of the CT.

Based on at least the determined operation parameters, the controller 38 may perform emission control operations (block 108). The emission control operations may be used to regulate certain gas concentrations and/or gas mass flows in the exhaust gases in compliance with the determined emission targets. Such operations may be performed by the controller 38 automatically or with certain instruction(s) provided by the CT operator during operations. Operation examples are provided below to impart some familiarity with the CT emission control operations.

For example, the controller 38 may perform an operation to control air supply to the compressor 20 (block 110). For instance, when the CT 10 enters a low load operation, the controller 38 may utilize the one or more bleed valves 21 on the compressor 20 to adjust the degree of valve opening. In some embodiments, the CT 10 may include one or more compressors 20. The controller 38 may partially open one or more bleed valves 21 in or between the one or more compressors 20 of the CT 10. The adjustment of valve opening may cause the bleed valves 21 to open further to reduce the air flow rate, resulting in a higher fuel-to-air ratio that will increase the combustion temperature in the combustor 16. As mentioned previously, increased combustion temperature may lower CO concentration in the exhaust gas 32. As such, the CT may operate at the low load (e.g., lower than 25% of CT full load) while meeting a CO emission target from the combustor 16 (e.g., a CO mass flow level below a predefined threshold at a low load operation).

Additionally, or alternatively, the controller 38 may perform a fuel supply management operation to increase the combustion temperature. That is, the controller 38 may perform an action to control fuel supply to the CT combustor (block 112). For instance, when the CT enters a low load operation, the controller 38 may utilize the one or more fuel nozzles 17 in the combustor 16 to increase fuel injections to the combustor 16. The increased fuel injection may increase the temperature of the combustion flame 18, thereby lowering CO concentration in the exhaust gas 32.

As the combustion temperature of the combustion flame 18 increases (e.g., after performing operations described in blocks 110 and 112), the formation of $NO_x$ in the exhaust gas 32 may increase. To meet the $NO_x$ emission target(s) from the combustor 16, the diluent injection system 19 may be utilized by the controller 38 to adjust diluent injection to the combustor 16 (block 114). The diluent injection may include injecting a diluent (such as water or steam) into the combustor 16. The diluent injection may be used to reduce the formation of $NO_x$ while maintaining an allowable range of CO concentration. For instance, the diluent may be used to reduce the NOx flow to a mass similar to that arriving at the SCR during high/full load operation of the CT 10. Alternatively, the flow of diluent may be reduced to increase a combustion temperature in the combustor 16, for example, by at least partially closing a diluent valve to reduce a diluent in the combustor 16.

Additionally, or alternatively, the controller 38 may perform one or more operations to adjust the catalyst assembly 35 in the exhaust section 34 (block 116). For example, the controller 38 may cause the catalyst assembly 35 to utilize one or more oxidation catalysts to treat specific emission(s) in the exhaust gas 32 to meet an overall emission target. Such oxidation catalysts may include a CO catalyst, a $NO_x$ catalyst, unburned hydrocarbon catalyst, and/or other suitable catalysts. In some embodiments, the catalyst assembly 35 may utilize a $NO_x$ catalyst to destroy $NO_x$ gases within the stream of exhaust gas 32. In some embodiments, a CO catalyst may be used to reduce the CO gas concentration and/or mass flow within the stream of exhaust gas 32. In certain embodiments, the controller 38 may cause the catalyst assembly 35 to selectively change the temperature of one or more components of the catalyst assembly 35 or inputs to the catalyst assembly 35 to increase catalyzation of the catalyst assembly 35. For instance, the controller 38 may selectively change the temperature of components of the catalyst assembly 35 or its inputs (e.g., air, ammonia, or a mixture of air and ammonia) to compensate for increased emission gases during the partial or no load condition.

In some cases, the catalyst assembly 35 may include a selective catalytic reduction (SCR) system. For example, the SCR system may convert $NO_x$ with the aid of catalyst(s) (e.g., a metal-based oxide such as titanium oxide) into diatomic nitrogen ($N_2$) and water ($H_2O$). A gaseous reductant (e.g., ammonia or urea) may be added to the exhaust gas 32 and adsorbed onto corresponding catalyst(s) to treat emission gases of a first emission gas type (e.g., NOx gases). The exhaust gas 32 mixed with the gaseous reductant may enter a catalyst reactor (or chamber). Increasing the amount of reductant can dynamically increase catalyzation in the catalyst assembly. The gaseous reductant may react selectively with the $NO_x$ within a specific temperature range and in the presence of the corresponding catalyst(s). As such, the SCR system may control the $NO_x$ emissions in compliance with an output $NO_x$ emission target.

It should be noted that, while at least some of the operations described above are discussed as performed separately, the controller 38 may perform multiple operations, including at least a portion of the example operations described above and/or other suitable operations that may help to control CT emissions, sequentially, simultaneously, or a combination thereof. For instance, the controller 38 may utilize the bleed valves 21 to adjust the degree of valve opening to increase fuel-to-air ratio while also increasing a rate of injection of fuel (e.g., partially opening a fuel valve). Such combined operations may increase the combustion temperature more efficiently than using one operation alone. In some embodiments, certain operations may be performed in a sequence to balance specific gas emissions generated in different operations. For instance, with an increased combustion temperature, the formation of $NO_x$ in the exhaust gas 32 may increase. To compensate for the $NO_x$ increase in the exhaust gas 32, an ammonia ($NH_3$) injection may be used by the SCR system to reduce the $NO_x$ emission in the treated exhaust gas exiting from the exhaust section 34.

During and/or after the emission control operations performed by the controller 38, the controller 38 may utilize various sensing and monitoring devices to measure CT performance-related parameters including emissions and/or temperatures (block 118). Such sensing and monitoring devices may be deployed among multiple CT components including the combustor 16 and the exhaust section 34.

In some embodiments, the controller 38 may utilize the temperature sensors 23 deployed in the combustor 16 to measure the temperature of the combustion flame 18. Additionally, the flame detectors 24 deployed in the combustor 16 may be used to detect the presence and the location of the combustion flame 18. The temperature sensors 23 and flame detectors 24 may be distributed in different locations of the combustor 16. Such distributed temperature and flame sensing may provide a detailed profile of the combustion flame 18 for enhanced combustion monitoring and controlling using at least one of the previously discussed control mechanisms.

In some embodiments, at the exhaust section 34, the controller 38 may utilize one or more temperature sensors 36 to measure the temperature of the exhaust gas 32. Further, emission sensors 37 may be used to measure the concentrations and/or mass flows of specific emission gases (e.g., CO and $NO_x$). The temperature sensors 36 and emission sensors 37 may be distributed in different locations of the exhaust section 34. For instance, some of the temperature sensors 36 and emission sensors 37 may be deployed before the exhaust gas 32 enters the catalyst assembly 35, while other temperature sensors 36 and emission sensors 37 may be deployed after the exhaust gas 32 exits from the catalyst assembly 35 after being treated. Such distributed temperature and emission sensing may provide temperature and emission variations before and after the treatment provided by the catalyst assembly 35 (e.g., using the oxidation catalysts and/or SCR system).

The measured CT performance-related parameters (e.g., the concentrations and mass flows of specific emission gases including CO and $NO_x$) may be analyzed by the controller 38, via one or more processors 66, to determine whether the performed operations (e.g., the blocks 110, 112, 114 and 116) in response to the new operating state of the CT yield allowable levels of emission gases (e.g., CO and $NO_x$ concentrations and mass flows) that meet the CT emission targets (block 119).

The measured CT performance-related parameters may also be sent to one or more monitoring devices to allow the CT operator to monitor CT performance (block 120). The monitoring may be conducted by the CT operator locally (e.g., via a display panel on the controller 38, a user interface on a computer communicatively linked to the controller 38 from an on-site CT control room, a Bluetooth device that is configured to receive the measured CT performance-related parameters, and the like), and/or remotely (e.g., via a smart phone or a virtual machine in a cloud that may access the measured CT performance-related parameters). This external monitoring may be used to fine-tune, repeat, and/or continue the emission controls operations 108.

Figure 3:
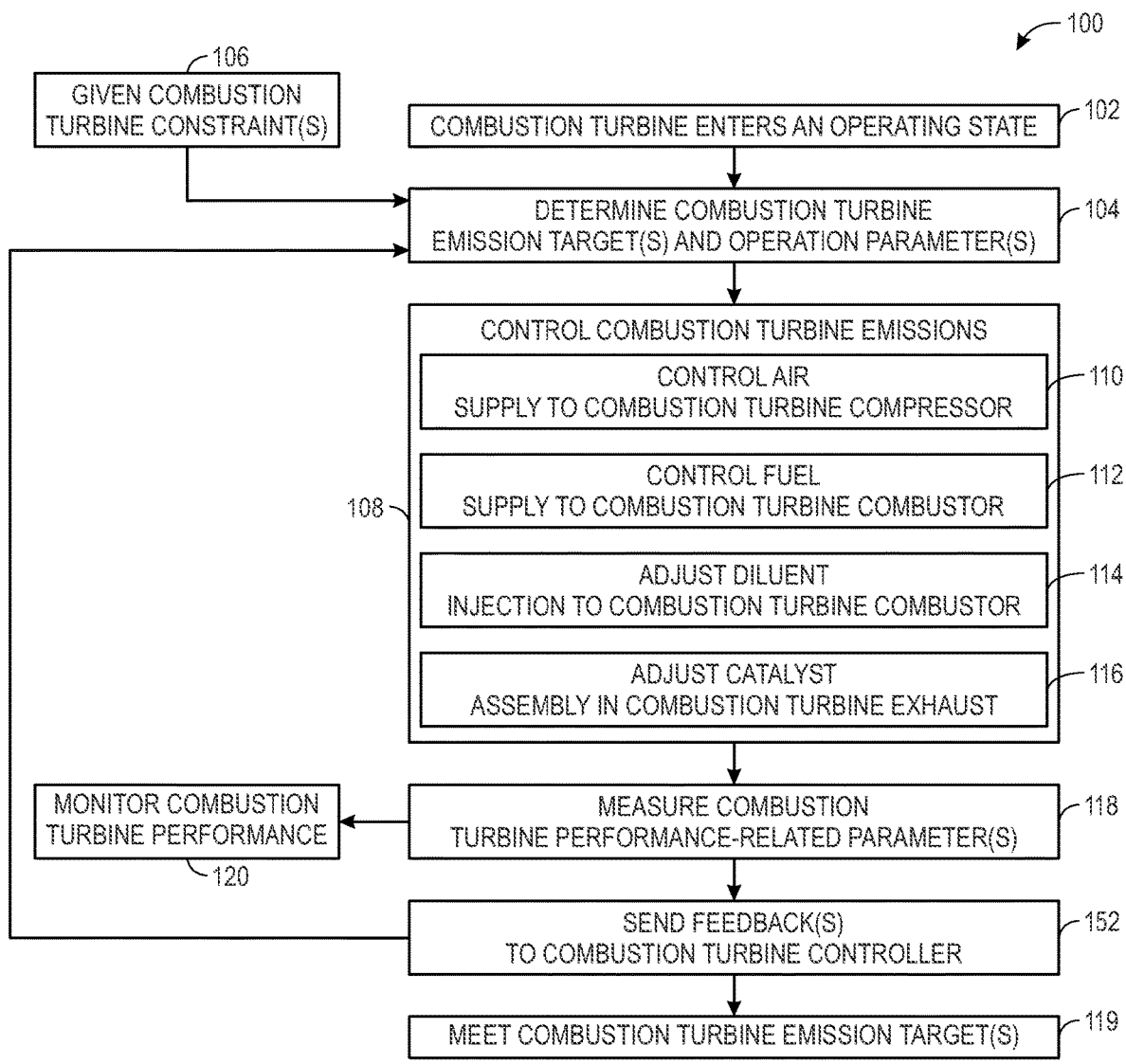
FIG. 3 shows a flow chart depicting an alternative emission control process that may use measurements from various sensing and monitoring devices as feedbacks to operate the combustion turbine engine of FIG. 1, in accordance with an embodiment.

Additionally, or alternatively, the various sensing and monitoring devices to measure CT performance-related parameters may be fed back to the controller 38 to enable the controller 38 to dynamically determine emission targets based at least in part on the CT performance-related parameters. For example, FIG. 3 illustrates a flow diagram of an emission control process 150 that may be used to feedback the CT performance-related parameters. Specifically, the emission control process 150 is similar to the emission control process 100 except that the emission control process 150 includes sending the CT performance-related parameters back to the controller 38 (block 152). That is, the controller 38, the various controllable devices (e.g., the bleed valves 21, the fuel nozzles 17, the diluent injection system 19, the catalyst assembly 35, and the like), and the various sensing and monitoring devices (e.g., the fuel sensor 15, the temperature sensors 23 and flame detectors 24 on the combustor 16, the temperature sensors 36 and emission sensors 37 on the exhaust section 34, and the like) may form a closed loop combustion turbine control system with feedbacks to dynamically determine the emission levels, relative to the emissions targets during operation of the CT 10.

For example, feedback data sent to the controller 38 may include temperature measurements acquired by the temperature sensors 23 in the combustor 16 and/or by the temperature sensors 36 in the exhaust section 34, combustion flame location detected by the flame detectors 24 in the combustor 16, emission measurements acquired by the emission sensors 37 of the exhaust section 34, and so on. Such feedback data may be analyzed by the controller 38, via the one or more processors 66 and the memory 68, to determine whether the performed operations 108 in response to the new operating state of the CT 10 yield allowable levels of emission gases (e.g., CO and $NO_x$ concentrations and mass flows). If certain emission gas levels exceed the CT emission targets, the controller 38, via one or more processors 66 and memory 68, may determine adjusted operation parameters to perform further operations 108 to control emissions in order to meet the CT emission targets.

In some embodiments, a model may be used by the controller 38 to determine the CT emission targets and operation parameters. The model may include a computer simulation model, physics-based model, an empirical model, and/or the like. Furthermore, the model may be stored in a non-transitory machine-readable medium (e.g., memory 68) or a remote network (e.g., a cloud via suitable computing and communication devices, such as servers and routers).

For example, a simulation model may use at least a portion of the feedback data, certain operating parameters/settings related to the current operating state of CT, and/or the operator-provided additional/supplemental information that relates to given CT operating constraints to run simulations to determine whether certain implemented operation parameters should be adjusted to provide improved emission control to meet the CT emission targets. Moreover, such a model-based CT emission control mechanism, as part of the combustion turbine control system, may be implemented in real-time or offline manner depending on the CT operation environment.

The disclosed embodiments in preceding sections are related to combustion turbine control systems that may be used to operate CTs in partial or no load while meeting emission targets. Such combustion turbine control systems may enable the CTs to perform a variety of operations to control CT emissions through regulating certain gas concentrations and/or gas mass flows in the exhaust gases. As previously discussed, the variety of operations may include, but are not limited to, controlling fuel and/or diluent injection(s) to combustor(s) to control combustion temperature, controlling compressor bleed valve(s) to control the combustion temperature, controlling the catalyst assembly (e.g., the SCR system) to process exhaust gases before release into the environment, or a combination thereof. As previously noted, these operations may enable the CT to maintain somewhat consistent exhaust conditions even in a low load operation.

For instance, an increased exhaust gas temperature (e.g., through controlling fuel or diluent injections) at a low load operation may enable controlling $NO_x$ and/or CO exhaust conditions (e.g., mass flow) to approximate the $NO_x$ and/or CO exhaust conditions at a high load operation. As the NOx mass flow is used to determine a size for a reductant (e.g., $NH_3$) injection system, maintaining NOx mass flow consistency between low loads and higher loads may enable the CT 10 to operate at a wider range of load levels while avoiding potentially costly modifications (i.e. reductant injection valve, manifold, vaporizer, and/or nozzle sizing) that otherwise may be necessary to allow for a wider variety of reductant flows. Similarly, because the CO mass flow and temperature are used to size the CO reduction catalyst within the SCR system, reducing CO concentration at low loads permits the size or design of the CO catalyst to be unchanged from SCRs that operate only with CTs running at relatively high loads (e.g., above 50%). In other words, CTs 10 equipped with simpler reductant injection systems sized for higher reductant flows and SCR systems with smaller and/or more efficient CO catalyst may have lower operational cost than CTs with complex reductant injection systems (e.g. having wider reductant flow range) and SCR systems with larger and/or less efficient CO catalyst. With such approaches, wider ranges of operation (e.g., close to 0 MW)

may be available without upsizing the SCR and/or modifying the reductant injection system.

With the preceding in mind, at partial or no load operation, the CT 10 may use the controller 38 to perform advanced operations. Simulations quantify a lower limit that the CT load can achieve while maintaining exhaust conditions similar to those of a standard CT at a baseline load. The baseline is the existing minimum load while remaining in emissions compliance. The simulation results demonstrate that the CT can be configured to operate at a lower minimum load (e.g., a minimum load equal to 37.5% of the baseline) than the baseline without expensive SCR modifications.

During each simulation, the compressor variable bleed valves (VBVs) were biased open, and the NOx water injection was reduced from standard values until the objectives (exhaust temperature, NOx mass flow, and CO concentration) were met. Some simulation results are shown in FIGS. 4-7.

Figure 4:
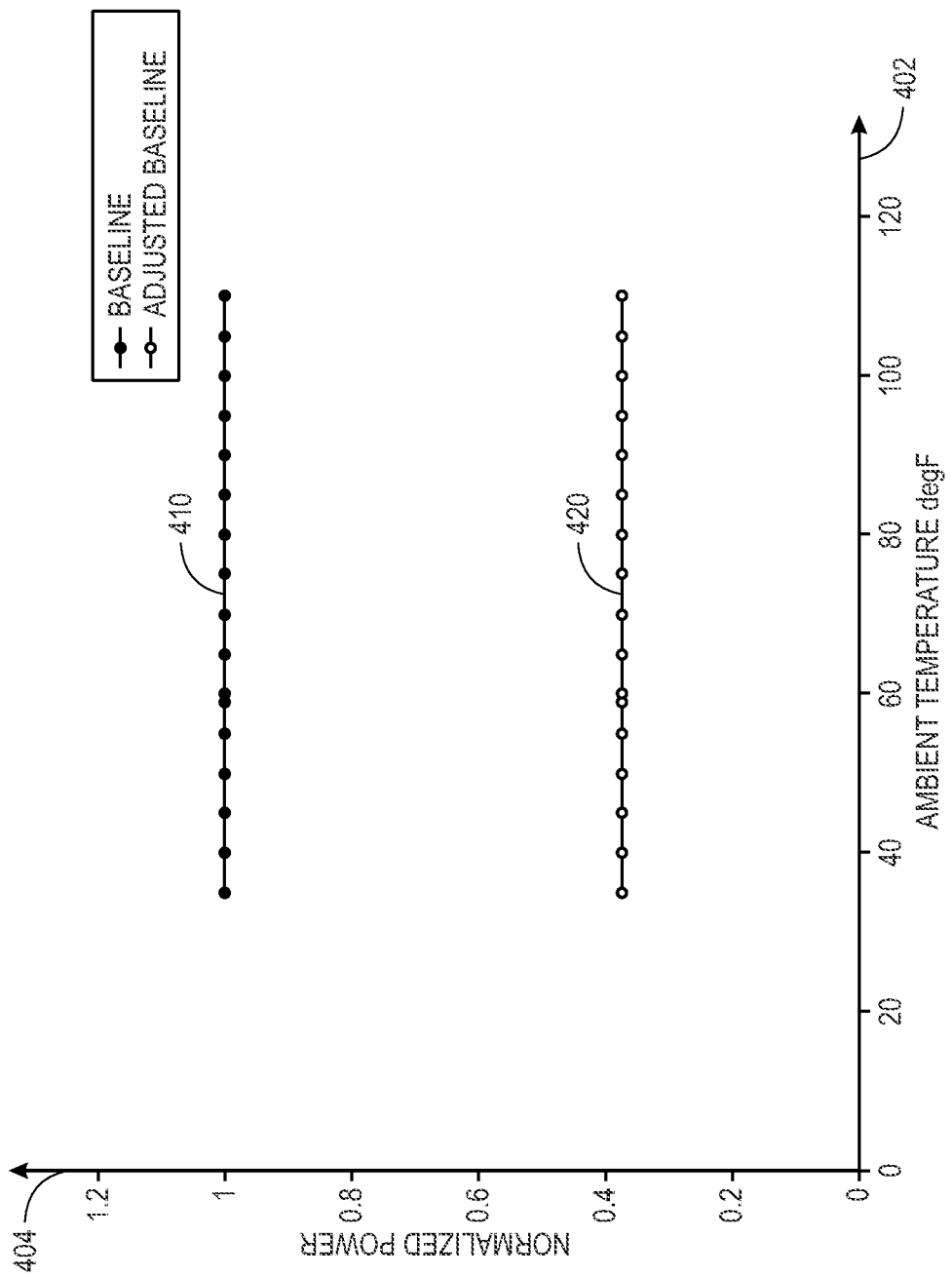
FIG. 4 is a normalized power vs. ambient temperature plot demonstrating the emission control process of FIG. 2 or FIG. 3 that may sustain a low power output across a temperature range, in accordance with an embodiment.

FIG. 4 is a plot of normalized power 404 versus ambient temperature 402 showing that enhanced CT controls may sustain a lower baseline 420, which is a portion (e.g., 37.5%) of the baseline power 410, across the temperature range. Points along the plot of the unmodified baseline power level 410 are filled circles, while the points along the plot of the adjusted baseline power level 420 are open circles.

Figure 5:
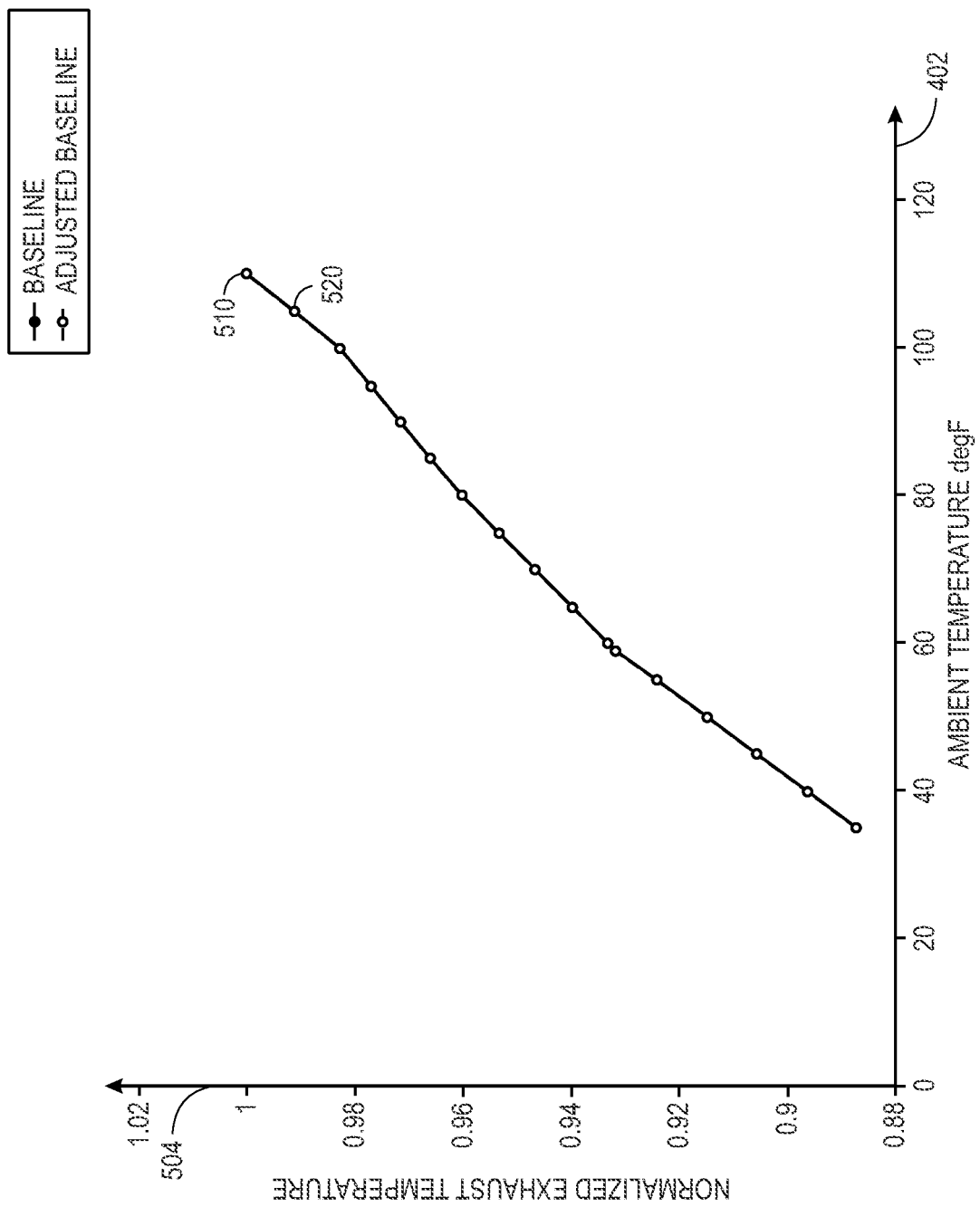
FIG. 5 is a normalized exhaust temperature vs. ambient temperature plot demonstrating the emission control process of FIG. 2 or FIG. 3 that may keep an exhaust temperature equal to a baseline temperature at a low load operation, in accordance with an embodiment.

FIG. 5 is a plot of normalized exhaust temperature 504 versus ambient temperature 402, which shows that the enhanced CT controls may keep exhaust temperature 520 approximately the same as baseline temperature 510, while the enhanced CT controls operate the CT at a lower load (e.g., 37.5% of the baseline power 410).

Figure 6:
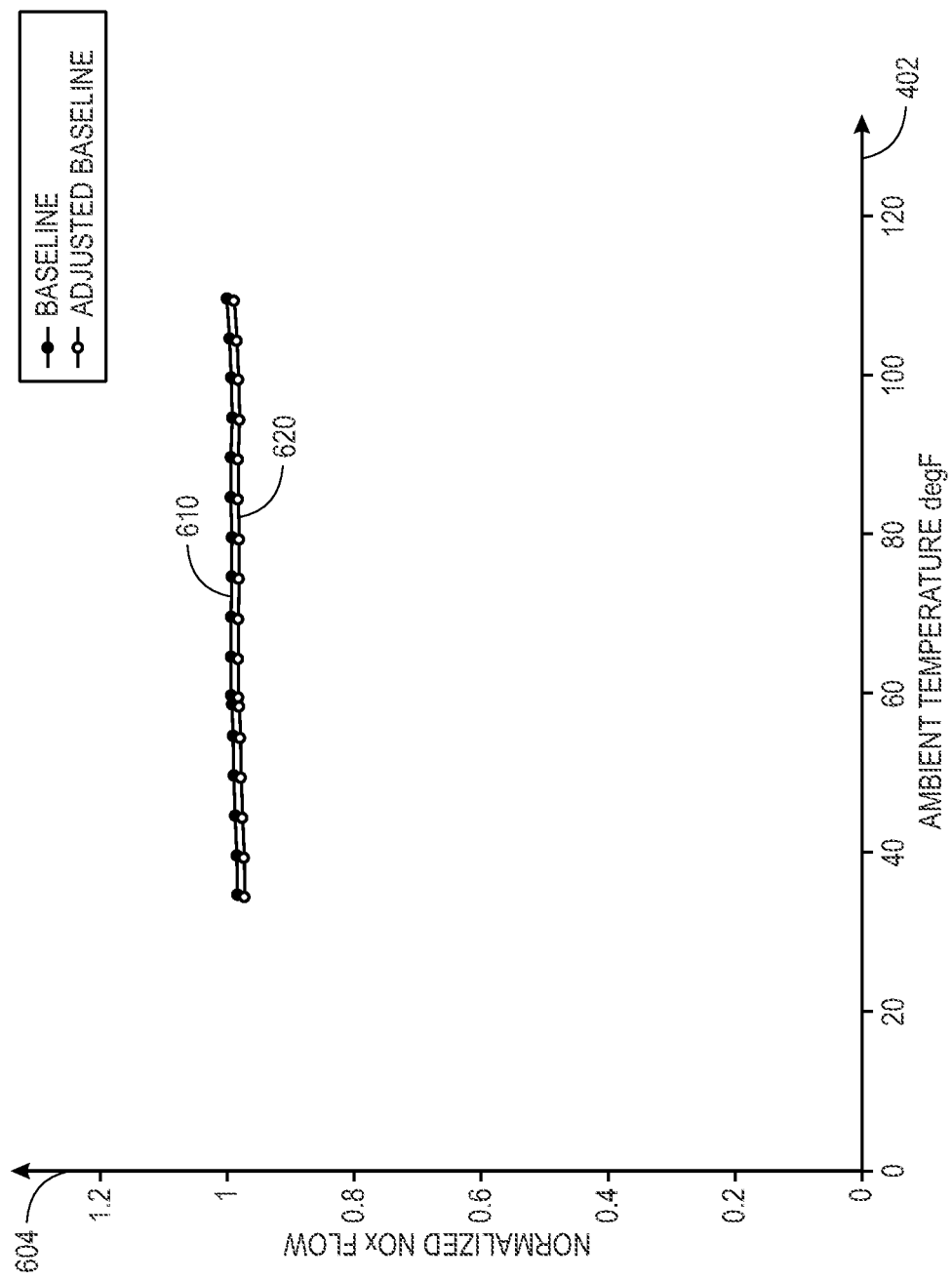
FIG. 6 is normalized NOx flow vs. ambient temperature plot demonstrating the emission control process of FIG. 2 or FIG. 3 that may keep an exhaust NOx mass flow rate equal to a baseline NOx mass flow rate at a low load operation, in accordance with an embodiment.

FIG. 6 is a plot of normalized NOx flow 604 versus ambient temperature 402, which shows that the enhanced CT controls may keep exhaust NOx mass flow rate 620 approximately equal to baseline NOx mass flow rate 610, while the enhanced CT controls operate the CT at a lower load than the baseline power 410.

Figure 7:
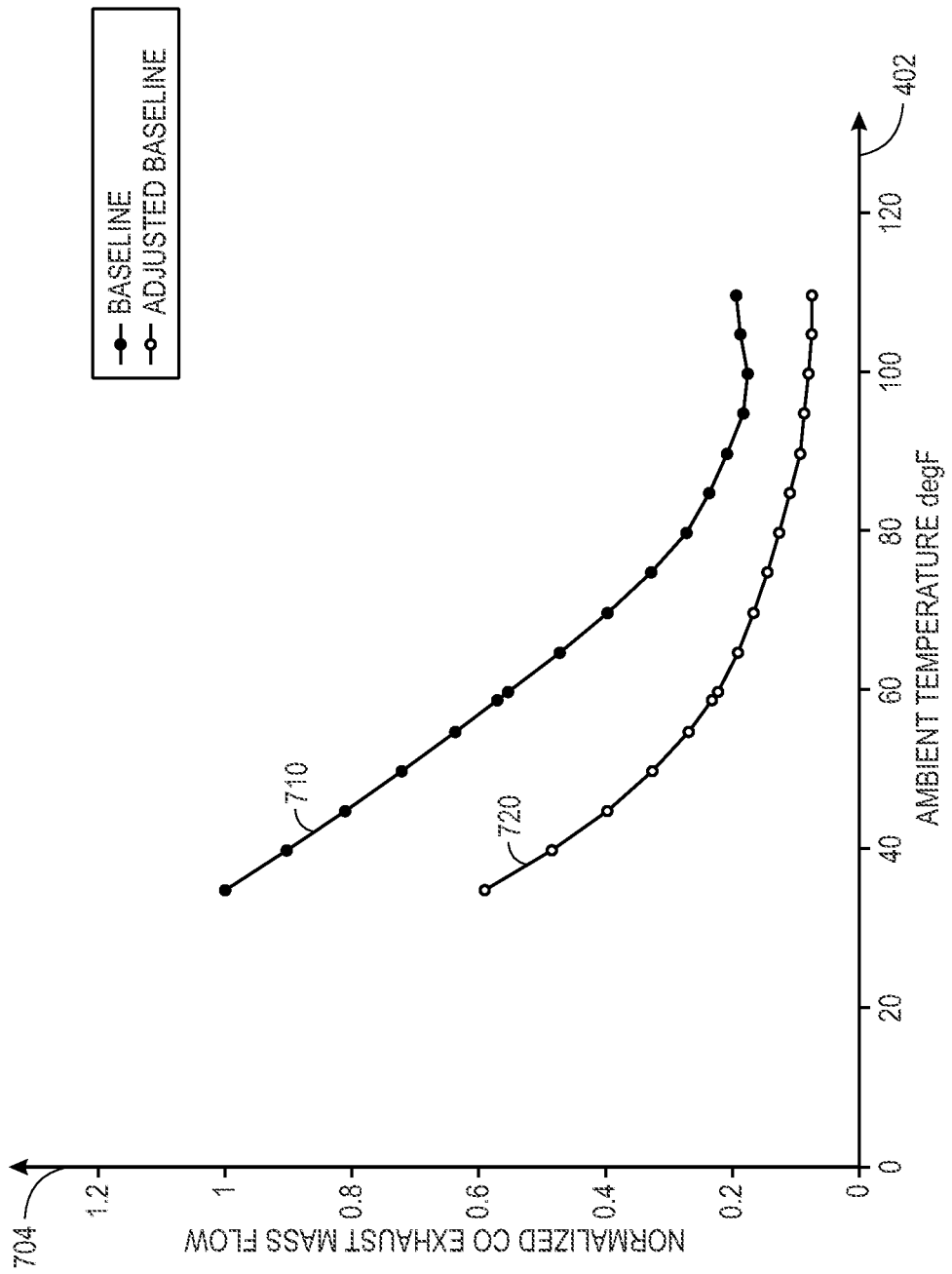
FIG. 7 is normalized CO exhaust master flow vs. ambient temperature plot demonstrating the emission control process of FIG. 2 or FIG. 3 that may keep an exhaust CO mass flow equal to or less than a baseline CO mass flow at a low load operation, in accordance with an embodiment.

FIG. 7 is a plot of normalized CO exhaust mass flow 704 versus ambient temperature 402, which shows that the enhanced CT controls may keep exhaust CO mass flow 720 equal to or less than baseline CO mass flow 710, while the enhanced CT controls operate the CT at a lower load than the baseline power 410. The baseline NOx mass flow rate 610 and the baseline CO mass flow 710 may be components of the exhaust emissions profile of the CT 10 at a minimum load condition in which the combustion temperature is not increased. In other words, the exhaust emissions profile may include the mass flow and/or concentrations of various exhaust emissions gasses, such as NOx and CO.

This written description uses examples to disclose the present systems and methods, including the best mode, and also to enable any person skilled in the art to practice the technology, including making and using any devices or systems and performing any incorporated methods. The patentable scope of the present subject matter is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
receiving an indication that a combustion turbine is to operate in a partial or no load condition;
responsive to receiving the indication, operating the combustion turbine in the partial or no load condition, thereby generating exhaust emissions;
increasing a combustion temperature in the combustion turbine in the partial or no load condition to increase a concentration of nitrous oxides (NOx) in the exhaust emissions and to reduce a concentration of carbon monoxide (CO) in the exhaust emissions while maintaining an exhaust gas temperature and an exhaust emissions profile of a minimum load condition in which the combustion temperature is not increased; and
increasing catalyzation in a catalyst assembly to treat emission gases to compensate for increased emission gases during the partial or no load condition by changing temperature of an input to the catalyst assembly.

2. The method of claim 1, wherein increasing the combustion temperature comprises at least partially reducing diluent flow into a combustor of the combustion turbine.

3. The method of claim 2, wherein at least partially reducing the diluent flow comprises at least partially closing a diluent valve.

4. The method of claim 1, wherein the indication comprises a processor-generated signal, an analog signal, a sensor signal from a sensor, an artificial intelligence inference from a neural network, a user input, or other suitable signals or inputs.

5. The method of claim 1, wherein increasing the combustion temperature in the partial or no load condition comprises increasing a fuel-to-air ratio in a combustor of the combustion turbine.

6. The method of claim 5, wherein increasing the fuel-to-air ratio comprises at least partially opening a fuel valve.

7. The method of claim 1, wherein increasing the combustion temperature comprises adjusting a plurality of fuel delivery valves to direct fuel flow into one or more fuel nozzles and into a combustor of the combustion turbine.

8. The method of claim 1, wherein increasing the combustion temperature comprises at least partially opening one or more bleed valves in a compressor of the combustion turbine, or between compressors of the combustion turbine.

9. The method of claim 1, wherein the catalyst assembly comprises a carbon monoxide catalyst, a nitrogen oxides catalyst, an unburned hydrocarbon catalyst, or other suitable catalysts.

10. The method of claim 9, wherein increasing catalyzation comprises selectively changing temperature of one or more components of the catalyst assembly.

11. The method of claim 1, wherein the input comprises air, ammonia, or a combination thereof.

12. A system, comprising:
a combustion turbine;
a plurality of sensing devices; and
a controller configured to execute a plurality of actions to control gas concentrations and gas mass flows in emission gases in compliance with emission targets, wherein the plurality of actions comprises:
receiving an indication that the combustion turbine is to operate at a load lower than a full-load;
determining operation parameters corresponding to the load lower than the full-load;
operating at the load lower than the full-load using the operation parameters; and
increasing a combustion temperature in the combustion turbine based at least in part on operating at the load lower than the full-load to increase a concentration of a first emission gas type and to reduce a concentration of a second emission gas type, wherein the plurality of actions comprises dynamically increasing catalyzation in a catalyst assembly used to treat emission gases to meet emission targets to compensate for the increased combustion temperature during the operating at the load lower than the full-load, wherein dynamically increasing catalyzation in the catalyst assembly comprises increasing injection of a reductant to treat emission gases of the first emission gas type.

13. The system of claim 12, wherein increasing the combustion temperature comprises controlling an air supply to a compressor of the combustion turbine.

14. The system of claim 12, wherein increasing the combustion temperature comprises controlling a fuel supply to a combustor of the combustion turbine.

15. The system of claim 12, wherein the first emission gas type comprises nitrous oxides (NOx) and the second emission gas type comprises carbon monoxide (CO).

16. The system of claim 12, wherein the reductant comprises ammonia or urea.

17. A system, comprising:
a combustion turbine;
a plurality of sensing devices;
a catalyst assembly configured to treat emission gases from the combustion turbine to meet emission targets; and
a controller configured to execute a plurality of actions to control gas concentrations and gas mass flows in the emission gases in compliance with emission targets, wherein the plurality of actions comprises:
receiving an indication that the combustion turbine is to operate in a partial or no load condition;
based at least in part on the indication, determining operation parameters corresponding to the partial or no load condition;
operating the combustion turbine in the partial or no load condition using the operation parameters, wherein adjusting the operation of the combustion turbine comprises increasing a combustion temperature of the combustion turbine by reducing a diluent flow into a chamber of the combustion turbine, increasing the combustion temperature results in an increase in a concentration of nitrous oxides (NOx) in exhaust emissions, and wherein adjusting the operation of the combustion turbine comprises increasing catalyzation in the catalyst assembly by increasing injection of a reductant or changing temperature of the reductant to treat the increase in the concentration of the nitrous oxides (NOx);
utilizing the plurality of sensing devices to measure performance-related parameters of the combustion turbine; and
adjusting the operation of the combustion turbine based at least in part on the performance-related parameters during the operation in the partial or no load condition.

18. The system of claim 17, wherein the plurality of sensing devices are configured to provide distributed temperature and emission sensing by deploying a first portion of temperature sensors, emission sensors, and/or models before emission gases enter the catalyst assembly and deploying a second portion of the temperature sensors, emission sensors, and/or models after the emission gases exit from the catalyst assembly.

19. The system of claim 17, wherein operating the combustion turbine in the partial or no load condition comprises increasing a combustion temperature in a combustor by changing a mixture of different fuel types used in the combustion turbine.

* * * * *